United States Patent
Tanino

(10) Patent No.: US 9,526,046 B2
(45) Date of Patent: Dec. 20, 2016

(54) COMMUNICATION CONTROL SYSTEM

(71) Applicant: DENSO CORPORATION, Kariya, Aichi-pref. (JP)

(72) Inventor: Hideki Tanino, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/423,333

(22) PCT Filed: Aug. 1, 2013

(86) PCT No.: PCT/JP2013/004666
§ 371 (c)(1),
(2) Date: Feb. 23, 2015

(87) PCT Pub. No.: WO2014/034022
PCT Pub. Date: Mar. 6, 2014

(65) Prior Publication Data
US 2015/0257058 A1  Sep. 10, 2015

(30) Foreign Application Priority Data
Aug. 28, 2012  (JP) ................................. 2012-187556

(51) Int. Cl.
*H04W 36/00* (2009.01)
*B60W 40/04* (2006.01)
(Continued)

(52) U.S. Cl.
CPC ......... *H04W 36/0083* (2013.01); *B60W 40/04* (2013.01); *B60W 40/06* (2013.01);
(Continued)

(58) Field of Classification Search
CPC .. H04W 36/0083; H04W 36/30; H04W 36/24; H04W 24/04; H04W 24/08; H04W 28/04; H04W 28/048; G08G 1/096725; G08G 1/096775; B62D 6/00; B62D 33/073; B62D 51/001; B62D 1/00
See application file for complete search history.

(56) References Cited

U.S. PATENT DOCUMENTS

| | | | |
|---|---|---|---|
| 6,130,626 A * | 10/2000 | Kane ................... | G08G 1/0104 235/384 |
| 2002/0121990 A1* | 9/2002 | Nomura ........... | G08G 1/096775 340/933 |
| 2004/0199303 A1* | 10/2004 | Ohmura ................. | G07B 15/00 701/5 |
| 2008/0215232 A1 | 9/2008 | Ikeda et al. | |
| 2009/0270105 A1 | 10/2009 | Kakumaru | |
| 2011/0118939 A1 | 5/2011 | Kawamata et al. | |
| 2012/0163275 A1* | 6/2012 | Kim ....................... | G08G 1/092 370/312 |

(Continued)

FOREIGN PATENT DOCUMENTS

| JP | H11181132 A | 1/1999 |
|---|---|---|
| JP | 2002027521 A | 1/2002 |

(Continued)

OTHER PUBLICATIONS

International Search Report and Written Opinion (in Japanese with English Translation) for PCT/JP2013/004666, mailed Oct. 29, 2013; ISA/JP.

*Primary Examiner* — Warner Wong
(74) *Attorney, Agent, or Firm* — Harness, Dickey & Pierce, P.L.C.

(57) ABSTRACT

A communication control system includes: a communication device that receives real-time information necessary for a vehicle control from an information delivery device via one of base stations; and a control device that controls the vehicle based on the real-time information. The communication device generates prediction information indicative of an index of remaining time before a communicating base station is switched with timing while the vehicle is running. The control device reduces a service level of the vehicle control for supporting at least one of a driving determination and a driving operation performed by a driver of the vehicle within the remaining time, which is shown in the prediction information.

5 Claims, 10 Drawing Sheets

(51) Int. Cl.
  *B60W 40/06* (2012.01)
  *H04W 4/04* (2009.01)
  *H04W 36/30* (2009.01)
  *G08G 1/0967* (2006.01)
  *G08G 1/16* (2006.01)
  *H04L 29/08* (2006.01)
  *H04L 29/06* (2006.01)
  *H04W 24/08* (2009.01)
  *B62D 1/00* (2006.01)
  *B62D 51/00* (2006.01)
  *H04W 36/08* (2009.01)
  *H04W 36/36* (2009.01)

(52) U.S. Cl.
  CPC . *G08G 1/096716* (2013.01); *G08G 1/096725* (2013.01); *G08G 1/096741* (2013.01); *G08G 1/096775* (2013.01); *G08G 1/164* (2013.01); *H04L 67/12* (2013.01); *H04L 69/14* (2013.01); *H04W 4/04* (2013.01); *H04W 24/08* (2013.01); *H04W 36/30* (2013.01); *B62D 1/00* (2013.01); *B62D 51/001* (2013.01); *H04W 36/08* (2013.01); *H04W 36/36* (2013.01)

(56) References Cited

U.S. PATENT DOCUMENTS

| | | | |
|---|---|---|---|
| 2014/0031044 A1* | 1/2014 | Mazzarella | H04W 36/245 455/440 |
| 2014/0095058 A1* | 4/2014 | Patel | G08G 1/20 701/117 |
| 2016/0054140 A1* | 2/2016 | Breed | H04W 4/02 701/408 |

FOREIGN PATENT DOCUMENTS

| | | | | |
|---|---|---|---|---|
| JP | 2002165254 A | 6/2002 | | |
| JP | 2005328500 A | 11/2005 | | |
| JP | 2007258782 A | 10/2007 | | |
| JP | 2008098880 A | 4/2008 | | |
| JP | 2008176397 A | 7/2008 | | |
| JP | 2008217314 A | 9/2008 | | |
| JP | 2009-246860 | * 10/2009 | | H04W 56/00 |
| JP | 2010000951 A | 1/2010 | | |
| JP | 4674222 B2 | 4/2011 | | |

* cited by examiner

COMMUNICATION CONTROL SYSTEM

CROSS REFERENCE TO RELATED APPLICATIONS

This application is a U.S. National Phase Application under 35 U.S.C. 371 of International Application No. PCT/JP2013/004666 filed on Aug. 1, 2013 and published in Japanese as WO 2014/034022 A1 on Mar. 6, 2014. This application is based on and claims the benefit of priority from Japanese Patent Application No. 2012-187556 filed on Aug. 28, 2012. The entire disclosures of all of the above applications are incorporated herein by reference.

TECHNICAL FIELD

The present disclosure relates to a communication control system for controlling a vehicle based on information transmitted via a base station.

BACKGROUND ART

Recently, in a cellular wireless technique, a reduction of a transmission delay (i.e., a low transmission delay) is developed by improvement of a communication speed, as represented by a communication standard defined as a LTE (long term evolution).

Accordingly, conventionally, application of the cellular wireless technique to a telematics application for a vehicle is limited to a control, which does not require a precise real time response, such as a web service, a tracking service for a stolen vehicle, and a remote engine start service. On the other hand, in future, a development for vehicle control using information, which requires the precise real time response, is expected.

It is considered to execute a driving support control of a subject vehicle using information indicative of a behavior of vehicles (including the subject vehicle and an object vehicle) on a road, a shape of the driving road, existence or non-existence of an on-coming vehicle near an intersection and the like, which is received via a base station, and to feedback information indicative of a behavior of the subject vehicle controlled by the driving support control as a communication control system for executing the above vehicle control.

Here, when the base station to be communicated with the subject vehicle is switched while driving the vehicle, in order to prevent a lost of received information, a frame is expanded, an upstream frame, which is not transmitted, is specified by transmitting and receiving information including information indicative of the order, the frame is transmitted from a certain base station to another base station, which is disposed toward a driving direction of the subject vehicle, the lost of the frame is detected at the another base station, and a resending operation of the lost frame is requested to the subject vehicle (please refer to Patent Literature No. 1, for example).

However, in a conventionally disclosed system, even though the lost of received information is prevented, a real-time property of the information is missed. In such a case, the system does not provide a countermeasure. Thus, a safety for driving support control may be reduced, for example. Thus, a problem may arise such that an user might be dangerous.

PRIOR ART LITERATURES

Patent Literature

Patent Literature 1: JP-2005-328500 A

SUMMARY OF INVENTION

It is an object of the present disclosure to provide a communication control system, which provides a safety at time when a base station is switched.

According to an example aspect of the present disclosure, a communication control system includes: a communication device that receives real-time information from an information delivery device, for delivering the real-time information that is necessary for a vehicle control, via one of a plurality of base stations for covering at least a part of a wireless cell, in which a vehicle is disposed; and a control device that controls the vehicle based on the real-time information received by the communication device. The communication device generates prediction information indicative of an index of remaining time before a communicating base station is switched with timing while the vehicle is running. The control device reduces a service level of the vehicle control for supporting at least one of a driving determination and a driving operation performed by a driver of the vehicle within the remaining time, which is shown in the prediction information generated by the communication device.

In the above communication control system, when the base station to communicate with the vehicle is switched while running, there is a possibility for losing real-time property of information. In view of this point, a level for supporting the driving determination and the driving operation is preliminary reduced in the vehicle control operation, so that dependency of the user on the system is temporally reduced. As a result, it provides that the user compensates a reduction of the service level. Accordingly, an influence of a loss of the real-time property of information over the vehicle control (eventually, over the user) is restricted. Thus, a safety in case of switching of the base station is secured.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

A first embodiment of the present disclosure will be explained with reference to the drawings as follows.

First Embodiment

Figure 1:
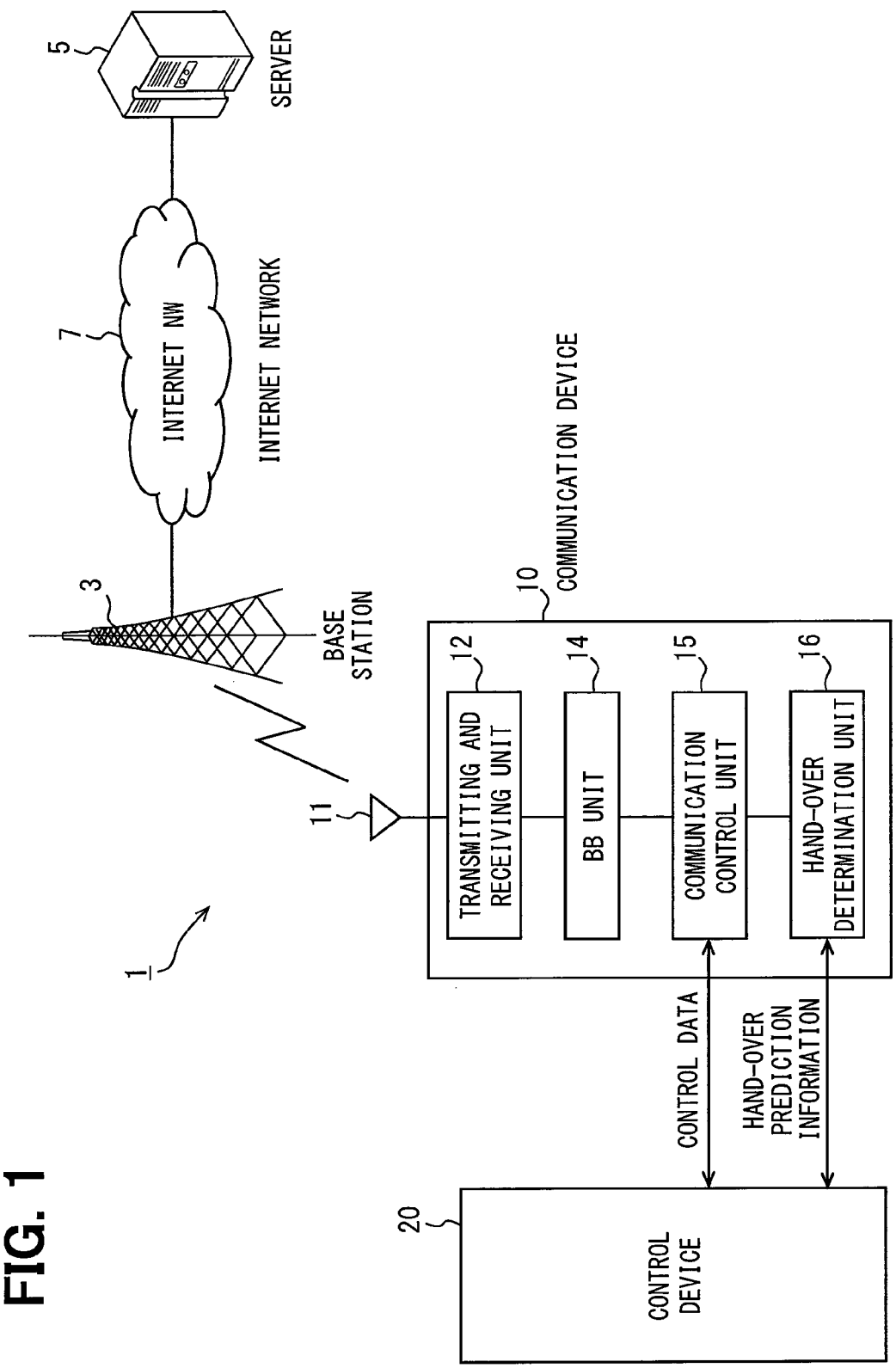
FIG. 1 is a diagram showing a construction of a communication control system according to a first embodiment.
Figure 2:
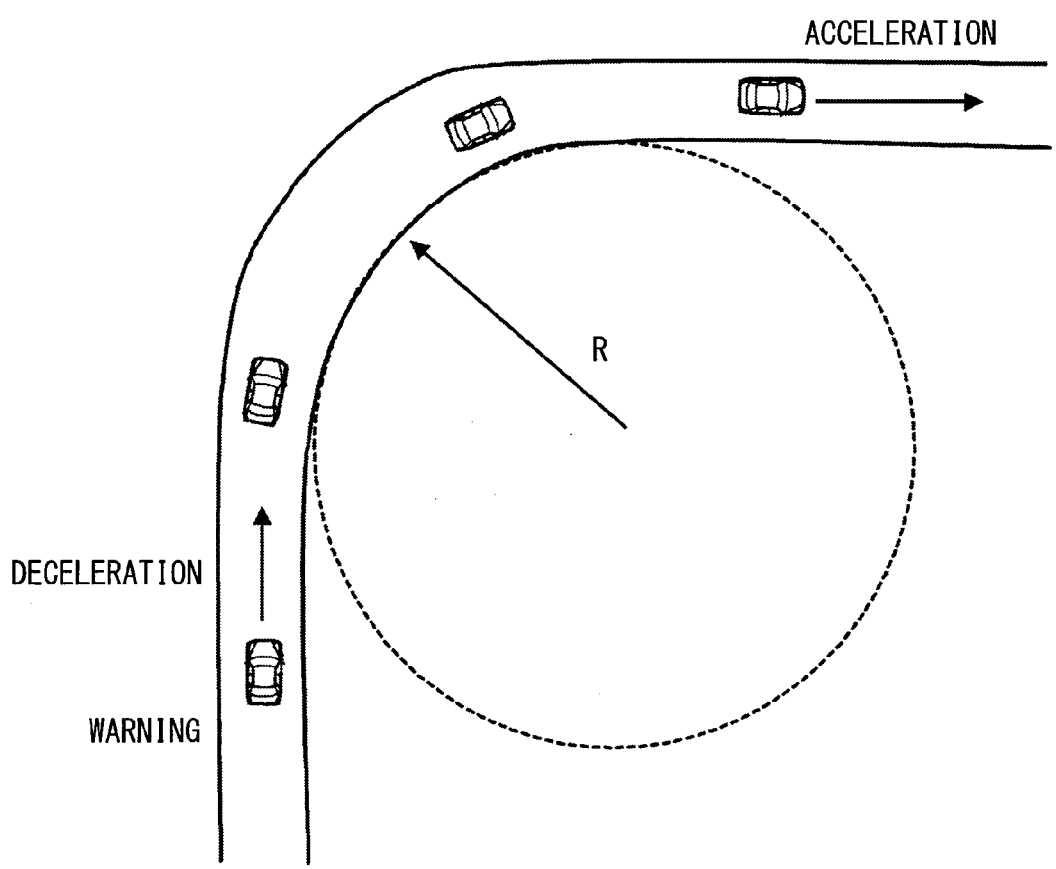
FIG. 2 is a diagram showing an explanation indicative of an example of a driving support control.

A communication control system 1 according to a first embodiment is a system mounted on a vehicle. As shown in FIG. 1, the system 1 includes a communication device 10 for wirelessly communicating with a server 5 via a base station 3 and a control device 20 for executing various control operations in a vehicle according to various information received by the communication device 10. The server 5 overall controls a ITS (i.e., intelligent transport system).

The server 5 is connected to an internet network 7. For example, the server 5 receives real-time image information, for specifying a behavior of the vehicle on a current road and existence and non-existence of an on-coming vehicle around an intersection or the like, from multiple road side devices (not shown), which are arranged on a road side. Further, the server 5 generates real-time position information indicative of a current position of the vehicle according to received information.

Further, the server 5 receives behavior information indicative of the behavior of a vehicle (i.e., "an object vehicle"), which mounts a communication control system 1, and position information generated by the object vehicle using a GPS (i.e., global positioning system) from the communication device 10 of the object vehicle. The server 5 generates correction information for vehicle control, which is prepared by correcting the current position of the object vehicle according to the received information such as the real-time position information. The behavior information in the above information is utilized by analysis of a mistake of cognition, decision and operation of a driver in the object vehicle.

The server 5 has a construction for transmitting the above real-time image information, the correction information and the like (which are generally defined as "real-time information") to the communication device 10 via the base station 3, which is used for the wireless communication by the communication device 10 within a wireless cell (i.e., "an in-range cell"), in which the object vehicle is disposed.

Multiple base stations 3 are arranged in a communication service area of each operating company. One of the base stations 3 wirelessly communicates with the communication device 10, which is disposed within the wireless cell covered by the base station 3. Further, the base station 3 communicates wirelessly or via a wire with the server 5, which is connected to the internet network 7. Further, the base station 3 always broadcasts a wireless signal, which includes a base station ID, a center frequency ID and a wireless method ID assigned in each base station 3, to the wireless cell covered by the base station 3.

The communication device 10 includes a transmitting and receiving unit 12 for wirelessly communicating with the server 5 via an antenna 11, a base band unit (which is defined as "a BB unit") for converting a signal transmitted and received by the transmitting and receiving unit 12 between an analog signal and a digital signal, a communication control unit 15 for controlling the transmitting and receiving unit 12 and the BB unit 14, and a hand-over determination unit 16 for determining whether a switching (which is defined as "a hand-over") of the base station 3, which is utilized in the wireless communication since the object vehicle moves, is performed.

The transmitting and receiving unit 12 converts a frequency of a reception RF signal, which is received via the antenna 11, to another frequency that is capable of being process in the BB unit 14. Further, the transmitting and receiving unit 12 converts data received from the BB unit 14 to the RF signal, and transmits the RF signal. For example, the transmitting and receiving unit 12 includes a receiving unit and a transmitting unit. The receiving unit downwardly converts the reception center frequency to an intermediate frequency that is capable of being received by the BB unit 14. The receiving unit filters a signal using a SAW filter for restricting a noise. Further, the receiving unit measures a transmitting and receiving electricity received via the antenna 11. The transmitting unit upwardly converts transmission data generated by the BB unit 14 to the transmission center frequency in order to wirelessly transmit the data. The transmitting unit amplifies a signal to have a predetermined transmission electricity using a PA (i.e., a power amp or a power amplifier), and transmits the signal.

The BB unit 14 executes a control for maintaining a communication connection and a modulation and demodulation defined in a cellular wireless method. For example, the BB unit 14 includes a receiving unit and a transmitting unit. The receiving unit retrieves a reception signal demodulated by the transmitting and receiving unit 12 using an A/D converter as digital data. Then, the receiving unit converts the digital data to various reception data (such as wireless control data and user communication data), which is defined by a wireless protocol and a format. Further, the receiving unit compensates the signal, executes follow-up control, and measures a signal level and a noise level. Thus, the receiving unit executes an electricity control operation. The transmitting unit demodulates the transmission data (such as wireless control data and communication data) generated by the communication control unit 15 using a predetermined method. Then, the transmitting unit converts the data between digital signal and an analog signal, and transmits the signal to the transmitting and receiving unit 12.

The communication control unit 15 generates the digital data in order to transmit the data according to a wireless protocol, which is preliminary defined to perform a wireless communication, based on various requirements input from the control device 20. The unit 15 retrieves data (i.e., the real-time information) used for the vehicle control from the digital data input from the BB unit 14, and supplies the data to the control device 20.

The communication control unit 15 retrieves level data, indicative of the signal level and the noise level, and the base station data such as the base station ID, the center frequency ID and the wireless method ID from the digital data input from the BB unit 14, and supplies the level data and the base station data to the hand-over determination unit 16. Further, the unit 15 performs a hand-over control operation according to necessity of the hand-over operation informed from the hand-over determination unit 16. Further, the unit 15 controls the transmitting and receiving unit 12 to use a value (i.e., a center frequency) indicated by the center frequency ID when the wireless communication is performed. Here, a communication standard in the first embodiment is a conventional LTE.

The hand-over determination unit 16 estimates a timing for switching the base station 3, which is used for the wireless communication, based on the base station data and the level data input from the communication control unit 15. The unit 16 outputs the information (i.e., "hand-over prediction information") indicative of an index for the switching timing to the control device 20.

The control device 20 executes a driving support control of the object vehicle based on the real-time information (i.e., the real-time image information and the correction information) input from the communication control unit 15. Here, the driving support control indicates a general control operation for supporting a driving operation of the driver and a driving decision of the driver in addition to the control operation (i.e., driving control) for a drive train apparatus such as an engine, a brake and a steering wheel. The general control operation includes a control for informing various information to the driver. For example, the generation control operation provides to control a driving operation in order to run the object vehicle autonomously based on the position information (or the correction information) and the road information, provides to inform a collision avoid when the vehicle turns right or left at an intersection and to inform an on-coming vehicle approach based on the real-time image information, and provides to display the real-time image information on a display (not shown).

Further, the driving support control includes multiple service levels as a level for supporting the driving decision and the driving operation executed by the driver of the object vehicle. Here, the control device 20 performs different control according to each service level.

For example, an example case will be explained such that the control device 20 performs a control for warning the driver of an approach to a curve and a driving control of the vehicle for reducing the speed appropriately when entering into the curve and for accelerating the vehicle appropriately when exiting from the curve when the vehicle runs along the curve having a curvature radius R. Here, the correction information is used for improving the current position accuracy of the object vehicle when the above control operations are performed.

When the service level is the highest level A1, the above driving support control operation is performed at all of curves having the curvature radius R. When the service level is the second highest level B1, the above driving support control operation is performed at a curve (i.e., only a gradual curve) having a curvature radius equal to or larger than a predetermined curvature radius R1. When the service level is the second lowest level C1, the driving control in the above driving support control operation is not performed, and only the warning control is performed. When the service level is the lowest level D1, the above driving support control operation is not performed.

Here, the control device 20 reduces the service level in the driving support control operation from the level A1 to the level B1 or the level C1 according to the hand-over prediction information input from the hand-over determination unit 16. Alternatively, the control device 20 reduces the service level in the driving support control operation from the level A1, the level B1 or the level C1 to the level D1 according to the hand-over prediction information input from the hand-over determination unit 16. Further, when the hand-over is completed successively, the control device 20 increases the service level in the driving support control operation from the level B1, the level C1 or the level D1 to the level A1.

Here, each of the control device 20, the communication control unit 15 and the hand-over determination unit 16 mainly includes a conventional microcomputer having a CPU, a ROM, a RAM, a I/O device and the like. Based on the program stored in the ROM, the CPU in the hand-over determination unit 16 executes the following hand-over determination process using the RAM as a working area.

Hand-Over Determination Process

Figure 3:
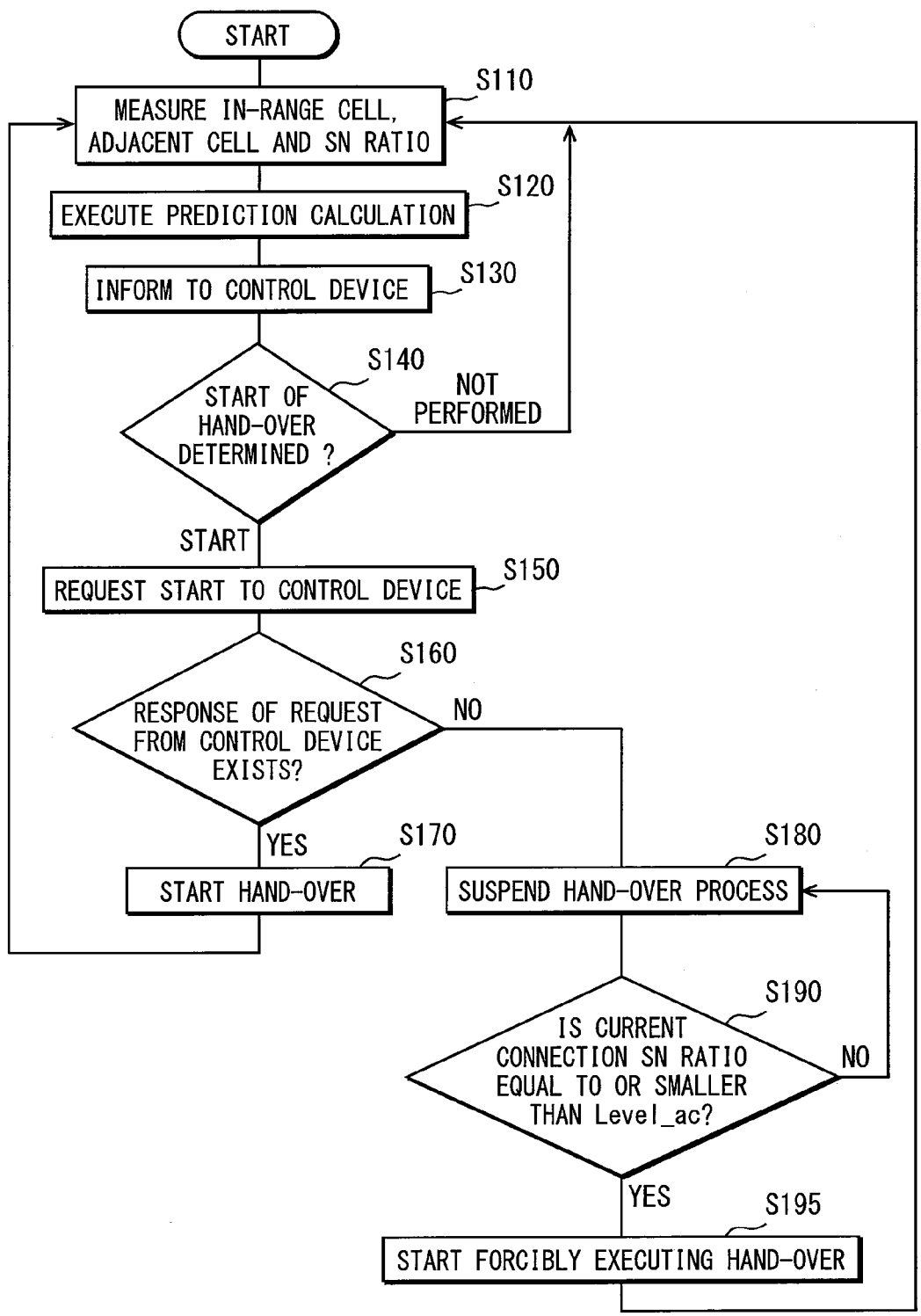
FIG. 3 is a flowchart showing a hand-over determination process executed by a communication device.

Here, a process (i.e., a hand-over determination process) executed by the hand-over determination unit 16 (i.e., the CPU) will be explained in detail with reference to the flowchart shown in FIG. 3. Here, the CPU starts to execute the present process when a control switch for executing the driving support control operation turns on under a condition that an ignition switch (i.e., IG switch) of the object vehicle is in an on-state, for example. The CPU repeatedly performs the process until the control switch turns off or the IG switch turns off.

When the present process starts, at step S110, the CPU measures a SN ratio (i.e., signal to noise ratio) of the reception signal from the base station (which is defined as "the in-range base station") that is used for the wireless communication and is arranged at a center of the wireless cell (i.e., the in-range cell), in which the object vehicle is disposed, according to the base station data (i.e., the base station ID) and the level data input from the communication control device 15. When multiple base station data (i.e., multiple base station IDs) is received, the CPU measures the SN ration of the reception signal from another base station (which is defined as "an adjacent base station"), which covers an adjacent wireless cell (which is defined as "an adjacent cell") that commonly shares a part of the in-range cell, according to the signal level data corresponding to each reception signal.

Figure 4A:
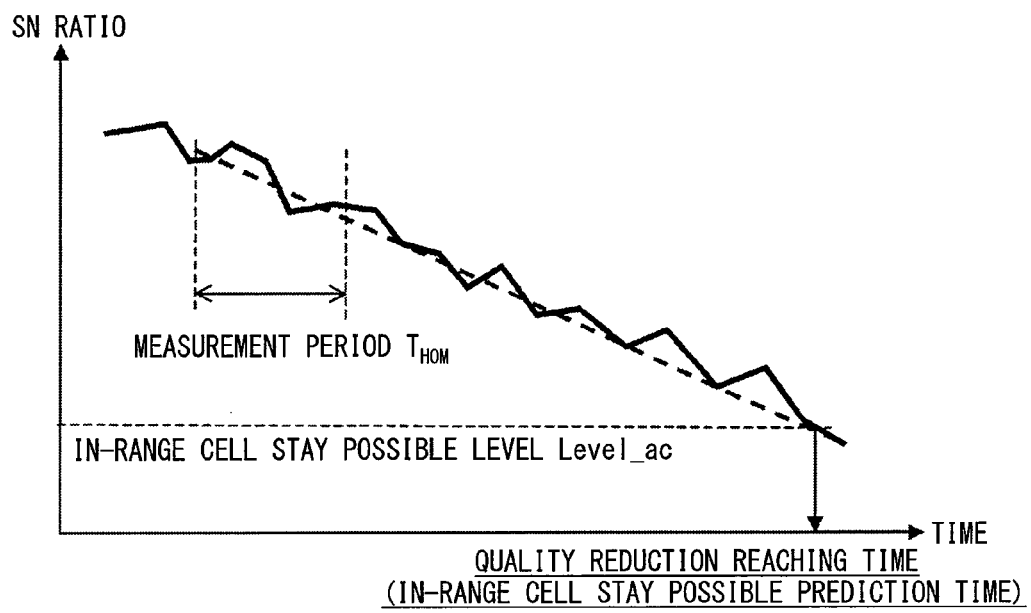
FIG. 4A is a graph showing a variation of a SN ratio of a received signal from an in-range base station.

Next, at step S120, as shown in FIG. 4A, the CPU calculates a slope α of an in-range SN ratio in a predetermined measurement period $T_{HOM}$ according to a variation of the SN ratio (which is defined as "the in-range SN ratio") of the reception signal from the in-range base station measured at step S110. Based on the calculated slope α, along which the in-range SN ratio is reduced, the CPU calculates (i.e., estimates) a time interval Tmin (which is defined as "a quality reduction reaching time") that elapses before the in-range SN ratio β at the present time reaches a predetermined in-range cell capable level SNmin, according to the following equation (1). Here, the in-range cell capable level (i.e., Level#ac) is a level indicative of a predetermined minimum reception quality. When the quality is reduced to be lower than the minimum reception quality, the wireless communication cannot be maintained.

$$Tmin=(SNmin-\beta)/\alpha \qquad (1)$$

Figure 5:
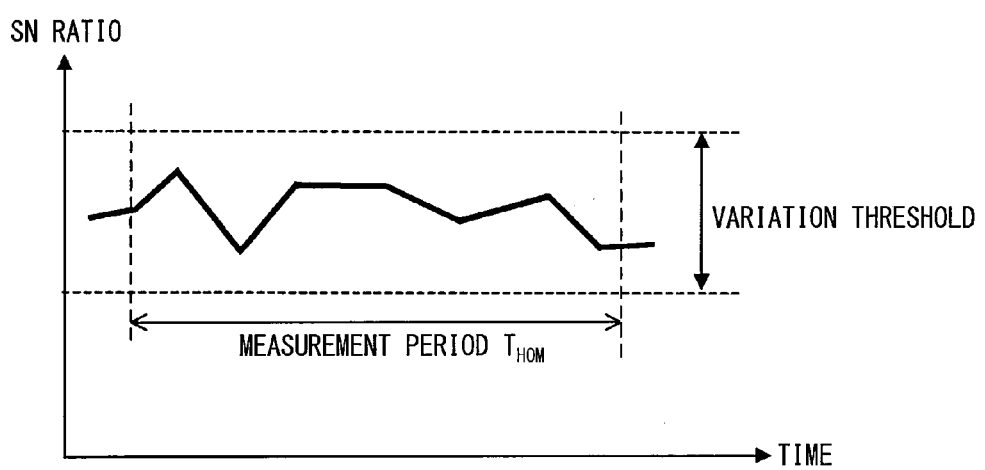
FIG. 5 is a second graph showing a variation of a SN ratio of a received signal from an in-range base station.

Here, as shown in FIG. 5, when the variation of the in-range SN ratio in the measurement period $T_{HOM}$ is equal to or smaller than a predetermined variation threshold, the CPU does not perform the estimation of the quality reduction reaching time Tmin using the equation (1).

Figure 4B:
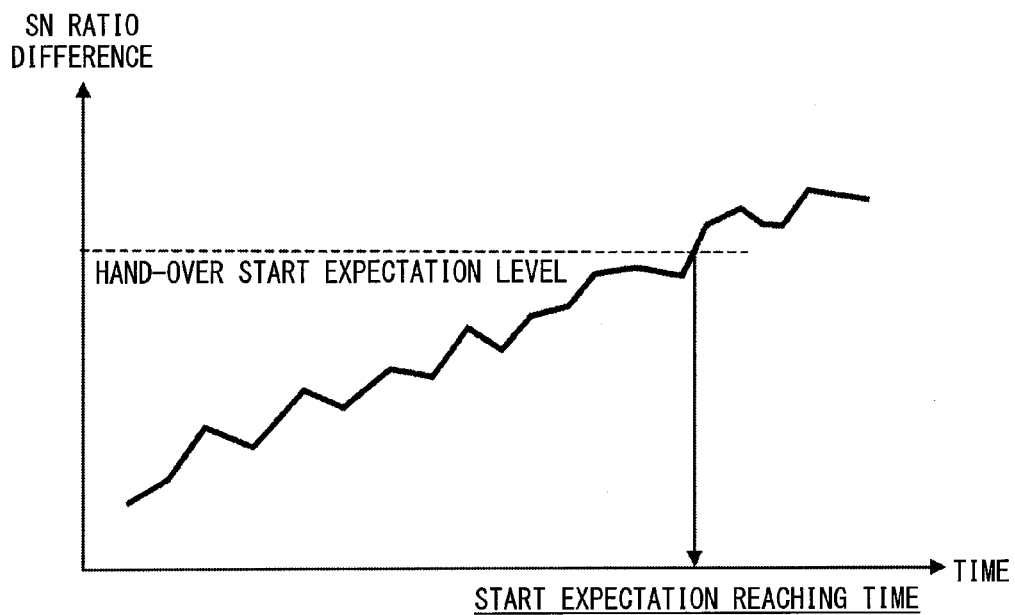
FIG. 4B is a graph showing a variation of a SN ratio difference.

When the SN ratio (which is defined as "an adjacent SN ratio") of the reception signal from the adjacent base station is measured at step S110, similarly, the CPU calculates a slope of the adjacent SN ratio in the measurement period $T_{HOM}$, and as shown in FIG. 4B, the CPU calculates a SN ratio difference indicative of a difference between the adjacent SN ratio and the in-range SN ratio. At the same time, the CPU calculates a slope of the SN ratio difference in the measurement period $T_{HOM}$. Based on the slope of the calculated SN ratio difference, the CPU estimates a time interval (which is defined as "start expectation reaching time") that elapses before the SN ratio difference at the present time reaches a predetermined hand-over start expectation level, according to the slope of the calculated SN ratio difference. Here, the hand-over start expectation level is a level indicating that the reception quality in a case where the adjacent base station is used for the wireless communication is better by an offset value than the reception quality of the current connection.

Next, at step S130, the CPU outputs information (which is defined as "hand-over prediction information") indicative of at least one of the quality reduction reaching time and the start expectation reaching time, which are estimated at step S120, to the control device 20. Here, the hand-over prediction information according to the first embodiment is output from the communication device 10 to the control device 20 at each predetermined transmission period $T_{HOP}$, which is measured by a timer (not shown) (please refer to FIG. 6). Further, the control device 20 can determine based on the hand-over prediction information input from the communication device 10 whether the real-time information is capable of being received from the server 5 without hand-over. Thus, when the device 20 determines that the time is coming to perform the hand-over, the device 20 reduces the service level in the driving support control operation within remaining time (which is at least one of the quality reduction reaching time and the start expectation reaching time), which is indicated by the hand-over prediction information.

Next, at step S140, the CPU determines based on the quality reduction reaching time and the start expectation reaching time, which are estimated at step S120, and the in-range SN ratio and the SN ratio difference whether the CPU starts to perform the hand-over. For example, when the in-range SN ratio is sufficiently larger than the in-range cell capable level although the remaining time of the quality reduction reaching time and the remaining time of the start expectation reaching time are short, or when the SN ratio difference is sufficiently smaller than the hand-over start expectation level, the CPU determines that the CPU does not execute the hand-over. Here, when the CPU determines that the CPU starts to execute the hand-over, it goes to step S150. When the CPU determines that the CPU does not execute the hand-over, it returns to step S110.

Figure 6:
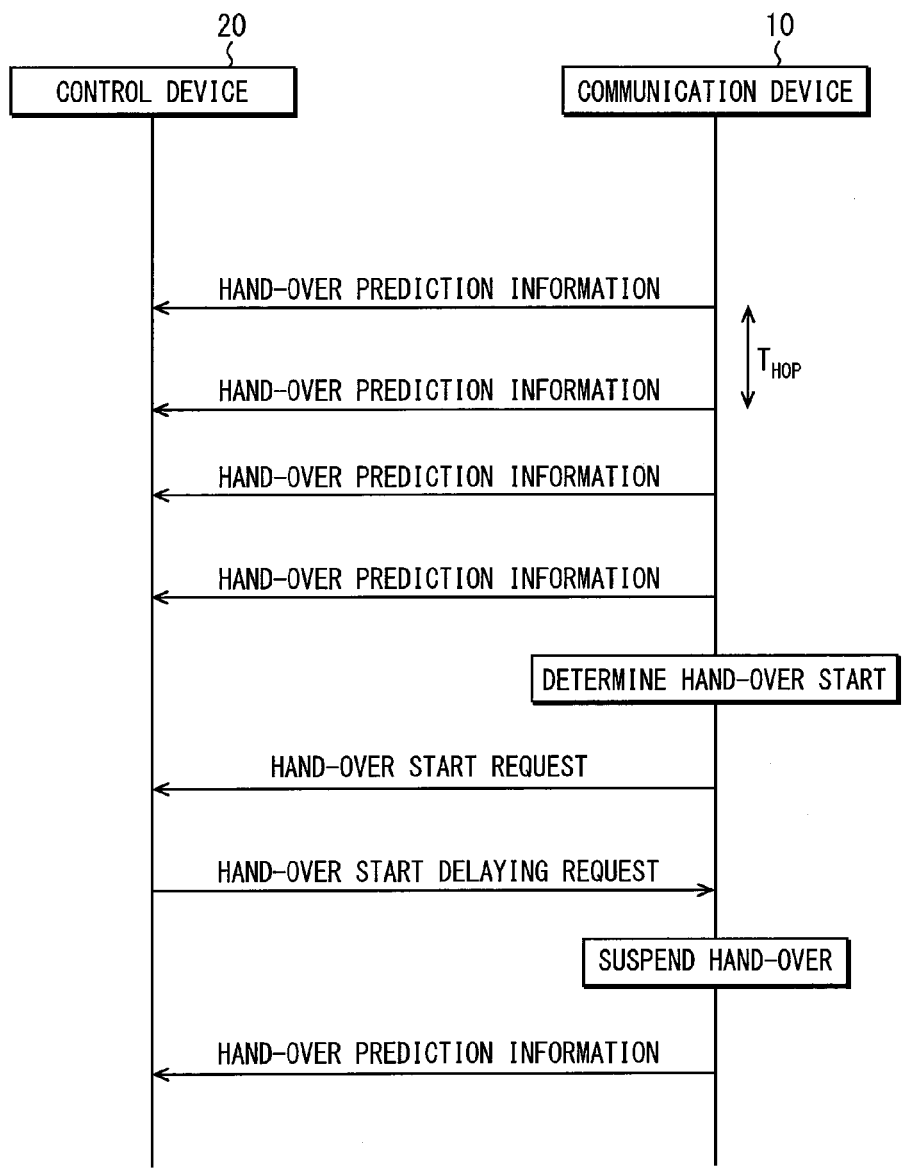
FIG. 6 is a diagram showing a chart of an operation example of the communication control system according to the first embodiment.

At step S150, the CPU outputs a request (which is defined as "a hand-over start request") for obtaining allowance of starting the hand-over to the control device 20 (please refer to FIG. 6). Here, the control device 20 outputs a request (which is defined as "a hand-over-start delaying request") for delaying a start timing of the hand-over to the control device 10 when the control device 20 receives the hand-over start request from the communication device 10, and control device 20 is executing a series of the driving control operations while the object vehicle is running along the curve, for example (please refer to FIG. 6). In a case other than this, the control device 20 outputs a response (which is defined as "hand-over request response") for allowing the start of the hand-over with respect to the hand-over start request to the communication device 10.

Next at step S160, the device 10 determines whether the device 10 receives the hand-over request response from the control device 20. When the device 10 determines positive, it goes to step S170. When the device 10 determines negative, i.e., when the device 10 receives the hand-over-start delaying request, it goes to step S180.

At step S170, the device 10 starts to execute a process (i.e., the hand-over process) for executing a conventional hand-over so that the base station 3 used for the wireless communication is switched from the in-range base station to the adjacent base station. Then, it returns to step S110.

On the other hand, at step S180, the device 10 suspends to start the hand-over process, and it goes to step S190. Here, while the device 10 is suspending to start the hand-over process, the device 10 continues to output the hand-over prediction information (please refer to FIG. 6).

At step S190, the device 10 determines whether the in-range SN ratio is equal to or smaller than the in-range cell capable level (i.e., Level#ac). When the device 10 determines that the in-range SN ratio exceeds Level#ac, it returns to step S180, and the device 10 stands by. When the device 10 determines that the in-range SN ratio is equal to or smaller than Level#ac, it goes to step S195.

At step S195, even when the device 10 does not receive the hand-over request response from the control device 20, the device 10 forcibly starts to execute the hand-over process, and it returns to step S110.

Effects

As described above, the communication control system 1 according to the first embodiment includes: the communication device 10 for receiving the real-time information from the server 5, as the information delivery device for delivering the real-time information necessary for the control of the object vehicle, via one of multiple base stations 3 for covering at least a part of the wireless cell, in which the object vehicle is disposed; and the control device 20 for performing the driving support control operation of the object vehicle based on the real-time information received from the communication device 10.

The driving support control operation provides multiple service levels as a level for supporting the driving decision or the driving operation executed by the driver of the object vehicle. The communication device 10 estimates the remaining time before the base station 3 used for the wireless communication is switched while the object vehicle is running. The control device 20 reduces the service level in the driving support control operation within the remaining time, which is estimated by the communication device 10.

In the communication control system 1 having the above structure, when the hand-over is performed, the level for supporting the driving decision and the driving operation is preliminary reduced in the driving support control operation in view of a possibility for lacking of the real-time property of the information. Thus, the dependence of the driver on the system 1 is temporally reduced.

Thus, the reduction of the service level is compensated by the decision and the operation of the driver, so that the influence of the lack of the real-time property of information to the driving support control operation (eventually, to the driver) is restricted. As a result, the safety of the hand-over is secured.

In the communication control system 1, the communication device 10 estimates the quality reduction reaching time (i.e., the remaining time) in a case where the current connection is maintained, according to the variation of the SN ratio of the reception signal from the in-range base station.

In the above construction, the control device 20 can reduce the service level in the driving support control operation at appropriate timing, which corresponds to the driving environment of the object vehicle within the time interval for maintaining the current connection without switching the base station 3, since it is possible to predict the hand-over start timing before the SN ratio of the reception signal becomes low.

In the communication control system 1, the communication device 10 estimates the start expectation reaching time (i.e., the remaining time) based on the SN ratio difference indicative of the difference between the SN ratio of the reception signal from the adjacent base station and the SN ratio of the reception signal from the in-range base station.

In the above construction, it is possible not to reduce the service level in the driving support control operation as much as possible since the control device 20 can maintain the current connection until the timing when the SN ratio of the reception signal is remarkably improved by the execution of the hand-over before the SN ratio of the reception signal becomes low.

In the communication control system 1, when the communication device 10 outputs the hand-over start request, and the device 10 inputs the hand-over request response from the control device 20, the system 1 executes the hand-over.

In the above construction, the control device 20 can switch the base station 3 at the appropriate timing corresponding to the control state of the object vehicle within the time interval (which is defined as "in-range cell stay possible prediction time") form maintain the current connection without executing the hand-over, so that the safety in a case where the hand-over is performed is much improved.

Further, in the communication control system 1, when the hand-over start request is input from the communication device 10 while the control device 20 is executing the driving control of the object vehicle as the driving support control, the device 20 outputs the hand-over start delaying request. When the communication device 10 inputs the hand-over start delaying request from the control device 20, the communication device 10 suspends the hang-over start process.

In the above construction, since the current connection is extended within the in-range cell stay possible prediction time, it is possible to restrict the interception of the communication during a series of the driving control operations in the object vehicle. Thus, the influence of the execution of the hand-over to the vehicle control is restricted.

Second Embodiment

Next, a second embodiment of the present disclosure will be explained with reference to the drawings. Here, in the second embodiment, a different part from the first embodiment will be explained. A common part of the first embodiment is skipped to explain using the same term and the same reference number.

The communication standard according to the first embodiment is only the LTE. The communication standard according to the second embodiment includes a combination the LTE (defined as 3.9G) and a IMT-Advanced (defined as 4G) determined by a ITU (international telecommunication union).

Figure 7:
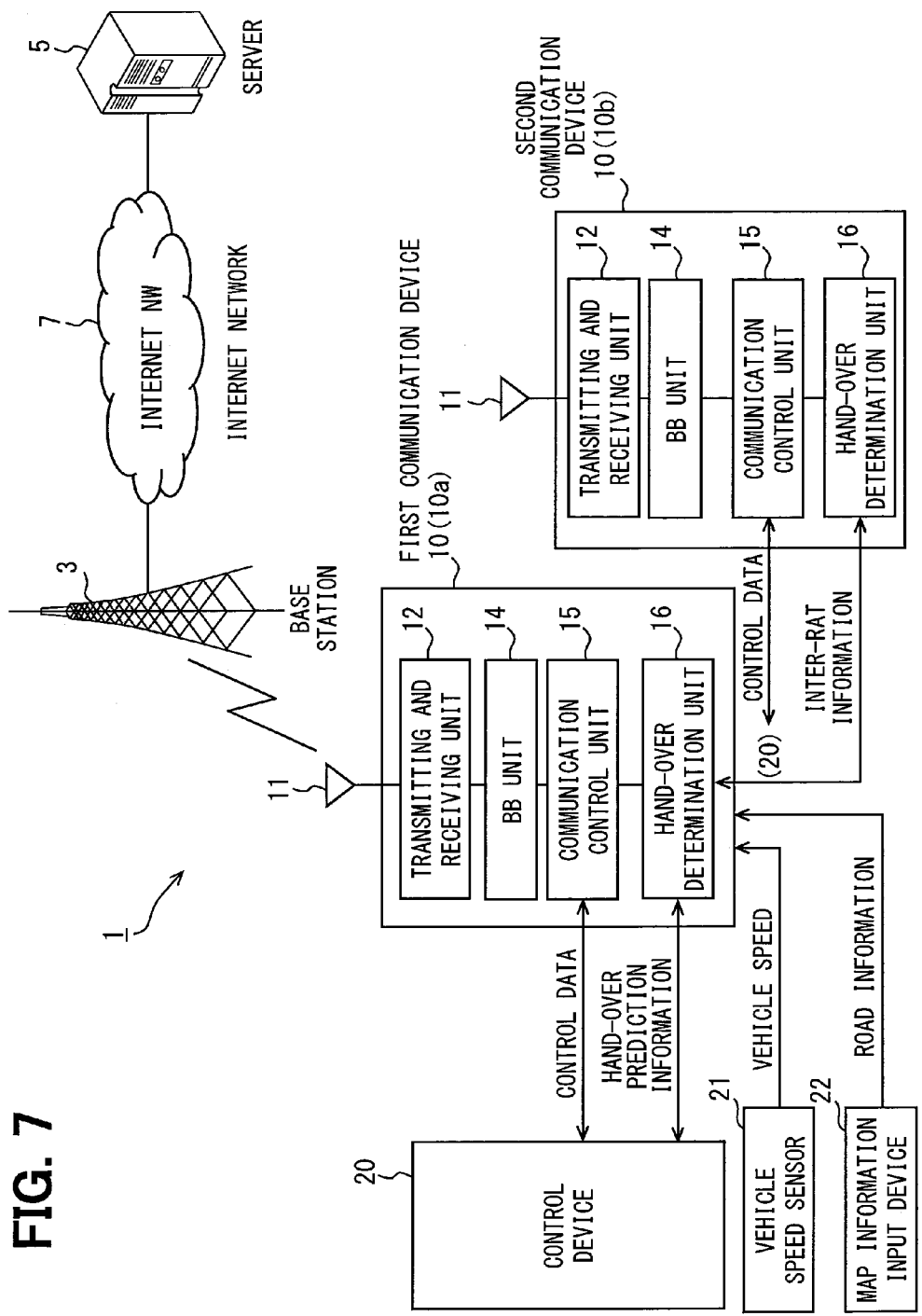
FIG. 7 is a diagram showing a construction of a communication control system according to a second embodiment.

Accordingly, in the communication control system 1 according to the second embodiment, as shown in FIG. 7, the system 1 includes at least two communication devices 10. Here, in the communication device 10, the first communication device 10a executes the wireless communication according to the communication standard of 3.9G, and the second communication device 10b executes the wireless communication according to the communication standard of 4G. A relevant one of the communication devices 15, i.e., one of the first communication device 10a and the second communication device 10b supplies the control data to the control device 20 every time the communication standard (i.e., the wireless communication method) to be used is changed in accordance with the execution of the hand-over.

Further, the base station data, the hand-over prediction information generated in the hand-over determination process, and the information (which is defined as "inter-RAT information") including the in-range SN ratio or the adjacent SN ratio to be calculated are exchanged between the hand-over determination unit 16 of the first communication device 10a and the hand-over determination unit 16 of the second communication device 10b.

The hand-over determination unit 16 of the first communication device 10a executes the hand-over determination process based on the information received via the antenna 11 of the device 10a. In addition, the unit 16 of the device 10a executes a process from step S130 to step S195 in the hand-over determination process using the inter-RAT information input from the second communication device 10b. The hand-over determination unit 16 of the second communication device 10b generates the inter-RAT information in the execution of a process in steps S110 and S120. Then, the unit 16 of the device 10b outputs the inter-RAT information to the hand-over determination unit 16 of the first communication device 10a.

Figure 8:
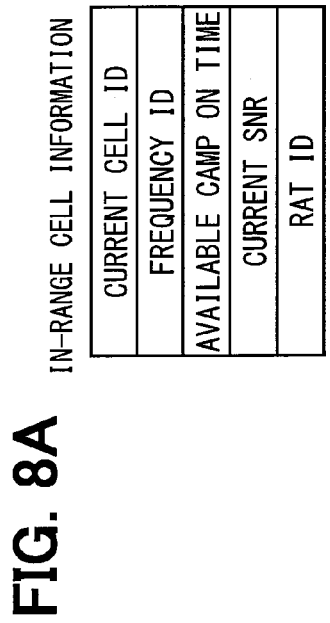
FIGS. 8A to 8C are diagrams showing explanation of a specific example of inter-RAT information.

Here, for example, as shown in FIG. 8A, the inter-RAT information includes the base station ID (corresponding to a current cell ID), the center frequency ID (i.e., frequency ID), the quality reduction reaching time (i.e., available camp on time), the in-range SN ratio (corresponding to a current SNR), and the wireless communication method ID (i.e., RAT ID) as the information (which is defined as "the in-range cell information") relating the in-range base station in the in-range cell.

As shown in FIG. 8B, the inter-RAT information includes the base station ID (corresponding to the current cell ID), the center frequency ID (i.e., frequency ID), the start expectation reaching time (corresponding to desire HO time), the adjacent SN ratio (corresponding to the current SNR) and the wireless communication method (i.e., RAT ID) as the information (which is defined as "the adjacent cell information") relating to the adjacent base station in the adjacent cell. Here, when multiple adjacent cells for covering the current position of the object vehicle exist, the adjacent cell information corresponding to the number of the adjacent cells can be obtained.

As shown in FIG. 8C, for example, when different wireless communication methods are used according to the second embodiment, the start expectation reaching time (i.e., desire HO time) in the adjacent cell information may be replaced with time (i.e., desire RAT HO time), which is adjusted in accordance with the difference of the wireless communication methods.

The hand-over prediction information according to the first embodiment is output from the communication device 10 to the control device 20 every predetermined transmission period $T_{HOP}$. The hand-over prediction information according to the second embodiment is output from the communication device 10 to the control device 20 every predetermined transmission period THOP, which is variably set according to at least one of the speed and the driving environment of the object vehicle.

Accordingly, in the communication control system 1 according to the second embodiment, as shown in FIG. 7, the vehicle speed sensor 21 for detecting the speed of the object vehicle and the map information input device 22 for inputting the map information including the road information, which provides an identification of a type of a road on which the object vehicle is driving are connected to the first communication device 10a.

The hand-over determination unit 16 of the first communication device 10a executes the transmission period setting process for variably setting the transmission period $T_{HOP}$, at which the hand-over prediction information is output to the control device 10 at step S130 in the hand-over determination process.

Transmission Period Setting Process

Here, the transmission period setting process executed by the hand-over determination unit 16 (i.e., the CPU) will be explained in detail with reference to the flowchart in FIG. 9. Here, in this process, the hand-over prediction information is generated by the execution from step S110 to step S120 in the hand-over determination process or by reception of the inter-RAT information from the second communication device 10b. Thus, the CPU starts to execute the transmission period setting process every time the hand-over prediction information is output to the control device 20.

Figure 9:
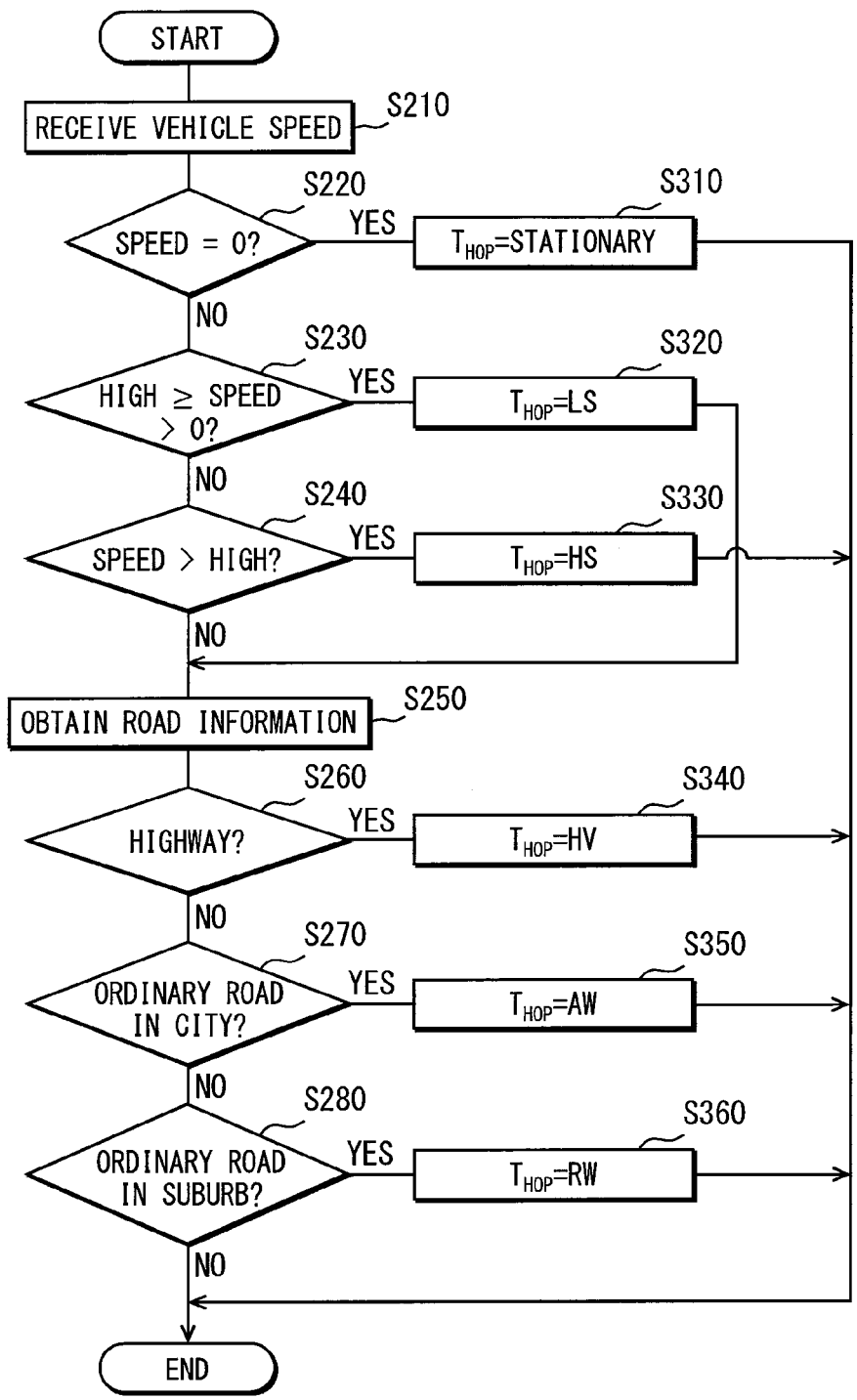
FIG. 9 is a flowchart showing an example of a transmission period setting process executed by the communication device.

First, when the CPU starts to execute the transmission period setting process, as shown in FIG. 9, the CPU receives the vehicle speed information indicative of the speed of the object vehicle from the vehicle speed sensor 21 (at step S210). Based on the vehicle speed information, the CPU sets the transmission period $T_{HOP}$ as follows. First, when the speed of the object vehicle is zero (i.e., when the determination at step S220 is "YES"), i.e., when the object vehicle is in a stop state, the CPU sets the transmission period $T_{HOP}$ to be the longest period, "i.e., stationary," which is the longest period among six transmission periods $T_{HOP}$ since the probability of occurrence of the hand-over is very small (at step S310). Then, the present process ends.

When the speed of the object vehicle is not zero (i.e., when the determination at step S220 is "NO"), and the speed exceeds zero and is equal to or smaller than a predetermined threshold speed (i.e., when the determination at step S230 is "YES"), i.e., when the object vehicle is in a low speed driving state, since the probability of occurrence of the hand-over is comparatively small, the CPU sets the transmission period $T_{HOP}$ to be the third longest period, i.e., "LS," among six transmission periods $T_{HOP}$ (at step S320). Then, it goes to step S250.

When the speed of the object vehicle exceeds the threshold speed (i.e., when the determination at step S240 is "YES"), i.e., when the object vehicle is in a high speed driving state, since the probability of occurrence of the hand-over is comparatively high, the CPU sets the transmission period $T_{HOP}$ to be the shortest period, i.e., "HS," among six transmission periods $T_{HOP}$ (at step S330). Then, the present process ends.

Next, the CPU obtains the road information from the map information input device 22 (at step S250). Based on the road information, the transmission period $T_{HOP}$ is adjusted as follows. First, when the type of the road, on which the object vehicle is driving, is a highway (i.e., when the determination at step S260 is "YES"), since the probability of occurrence of the hand-over is much increased, the CPU sets the transmission period $T_{HOP}$ to be the second shortest period, i.e., "HV," among six transmission periods $T_{HOP}$ (at step S340). Then, the present process ends.

When the type of the road, on which the object vehicle is driving, is not the highway (i.e., when the determination at step S260 is "NO"), and the type of the road is an ordinary road in a city (i.e., the determination at step S270 is "YES"), since the probability of occurrence of the hand-over is comparatively increased, the CPU sets the transmission period $T_{HOP}$ to be the third shortest period, i.e., "AW," among six transmission periods $T_{HOP}$ (at step S350). Then, the present process ends.

When the type of the road, on which the object vehicle is driving, is not the ordinary road in the city (i.e., when the determination at step S270 is "NO"), and the type of the road is an ordinary road in a suburb (i.e., the determination at step S280 is "YES"), since the probability of occurrence of the hand-over is reduced, the CPU sets the transmission period $T_{HOP}$ to be the second longest period, i.e., "RW," among six transmission periods $T_{HOP}$ (at step S360). Then, the present process ends.

Thus, in the second embodiment, the transmission periods $T_{HOP}$ have a relationship of "stationary">"RW">"LS">"AW">"HV">"HS." The relationship may not be limited to this relationship. The relationship may be changeable in a scope satisfying at least a relation of "stationary">"LS">"HS" and a relation of "RW">"AW">"HV."

Operation Example

In the communication control system 1 according to the second embodiment having the above construction, the hand-over prediction information is output from the first communication device 10a to the control device 20 at the transmission period $T_{HOP}$ set in the transmission period setting process.

Figure 10:
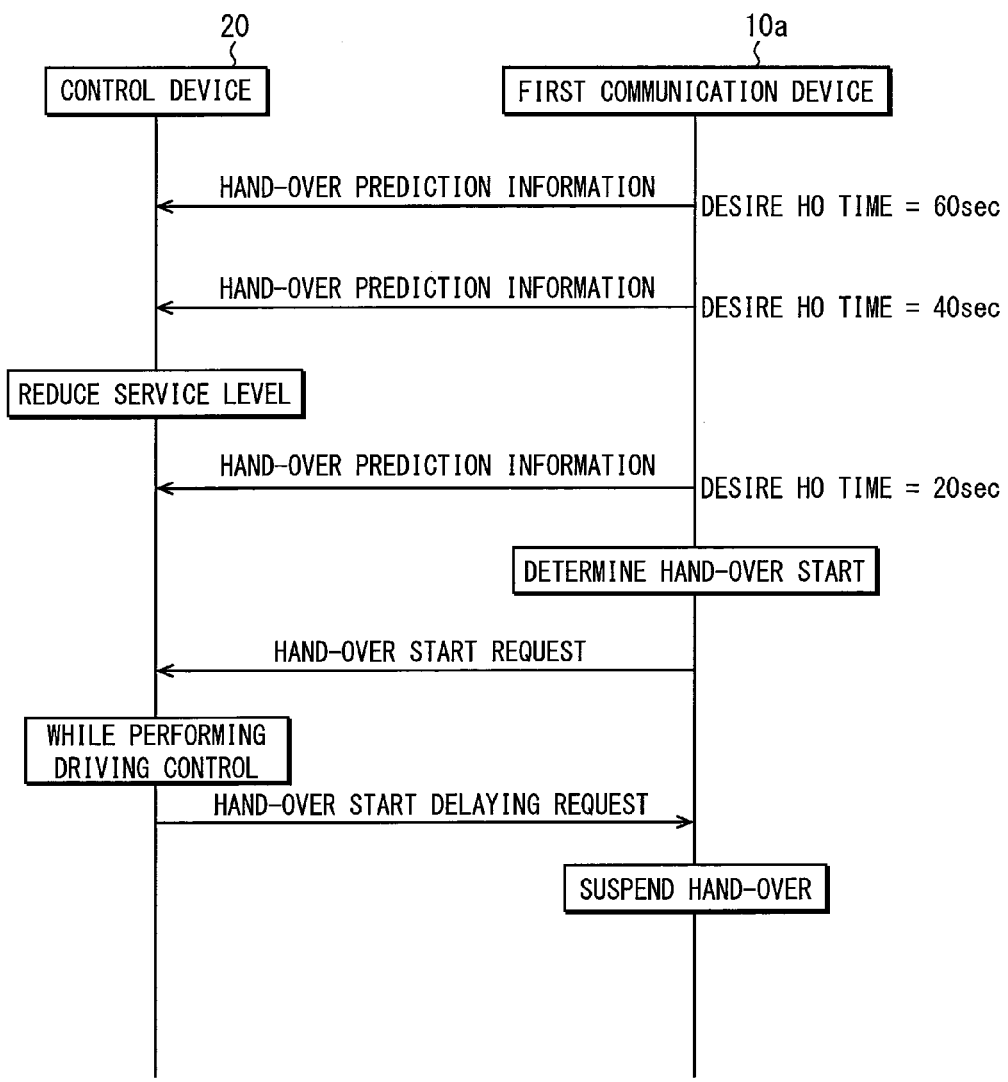
FIG. 10 is a diagram showing a chart of an operation example of the communication control system according to the second embodiment.

Further, as shown in FIG. 10, the control device 20 reduces the service level in the driving support control as a trigger when the remaining time (for example, the start expectation reaching time (i.e., desire HO time)) presented in the hand-over prediction information input from the first communication device 10a shows the predetermined threshold time (for example, 40 seconds).

Similar to the first embodiment, the control device 20 outputs the hand-over start delaying request to the first communication device 10a while executing a series of the driving control when the device 20 inputs the hand-over start request from the first communication device 10a, so that the control device 20 suspends the start of the hand-over process.

Effects

As described above, in the communication control system 1 according to the second embodiment, the communication device 10 outputs the hand-over prediction information indicative of at least one of the quality reduction reaching time and the start expectation reaching time with the predetermined transmission period $T_{HOP}$. The control device 20 reduces the service level in the driving support control based on the hand-over prediction information input from the communication device 10 as a trigger when the remaining time represents the predetermined threshold time.

In the above construction, since the timing for reducing the service level in the driving support control is simply determined, the process load of the communication device 10 and the control device 20 is reduced.

Further, in the communication control system 1, the communication device 10 variably sets the transmission period $T_{HOP}$ according to at least one of the speed of the object vehicle and the driving environment.

In the above construction, for example, when the speed of the object vehicle is small, or when the object vehicle runs in an urban area, the moving time of the object vehicle from the in-range cell to the adjacent cell is long. Thus, the transmission period $T_{HOP}$ is set to be long, so that unnecessary information transmitted and received between the communication device 10 and the control device 20 is restricted. Further, for example, when the speed of the object vehicle is high, or when the object vehicle runs on the highway, the moving time of the object vehicle from the in-range cell to the adjacent cell is short. Thus, the transmission period $T_{HOP}$ is set to be short, so that a loss of timing for reducing the service level in the driving support control is restricted.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication control system for a vehicle, the vehicle control system comprising:
    a communication device that receives real-time information from an information delivery device, for delivering the real-time information that is necessary for a vehicle control, via one of a plurality of base stations for covering at least a part of a wireless cell; and
    a control device that controls the vehicle based on the real-time information received by the communication device,
    wherein the communication device generates prediction information indicative of an index of remaining time before a communicating base station is switched with timing while the vehicle is running,
    wherein the control device reduces a service level of the vehicle control for supporting at least one of a driving determination and a driving operation performed by a driver of the vehicle within the remaining time, which is shown in the prediction information generated by the communication device;
    wherein the wireless cell, in which the vehicle is disposed, is defined as an in-range cell,
    wherein the one of the plurality of base stations, which is used for wireless communication by the communication device, is defined as an in-range base station in the in-range cell, and
    wherein the communication device estimates the remaining time based on a variation of a SN ratio of a reception signal from the in-range base station.

2. The communication control system according to claim 1,
    wherein another wireless cell, which shares a part of the in-range cell, is defined as an adjacent cell,
    wherein another one of the base stations, which covers the adjacent cell, is defined as an adjacent base station, and
    wherein the communication device estimates the remaining time based on a SN ratio difference indicative of a difference between the SN ratio of the reception signal from the in-range base station and a SN ratio of a reception signal from the adjacent base station.

3. A communication control system for a vehicle, the vehicle control system comprising:
    a communication device that receives real-time information from an information delivery device, for delivering the real-time information that is necessary for a vehicle control, via one of a plurality of base stations for covering at least a part of a wireless cell; and
    a control device that controls the vehicle based on the real-time information received by the communication device,
    wherein the communication device generates prediction information indicative of an index of remaining time before a communicating base station is switched with timing while the vehicle is running,
    wherein the control device reduces a service level of the vehicle control for supporting at least one of a driving determination and a driving operation performed by a driver of the vehicle within the remaining time, which is shown in the prediction information generated by the communication device;
    wherein the communication device outputs the prediction information at a predetermined transmission period ($T_{HOP}$), and
    wherein the control device reduces the service level of the vehicle control as a trigger when the remaining time indicated in the prediction information input from the communication device represents a predetermined threshold time.

4. The communication control system according to claim 3,
    wherein the communication device variably sets the transmission period according to at least one of a speed of the vehicle and a driving environment of the vehicle.

5. A communication control system for a vehicle, the vehicle control system comprising:
    a communication device that receives real-time information from an information delivery device, for delivering the real-time information that is necessary for a vehicle control, via one of a plurality of base stations for covering at least a part of a wireless cell; and
    a control device that controls the vehicle based on the real-time information received by the communication device,
    wherein the communication device generates prediction information indicative of an index of remaining time before a communicating base station is switched with timing while the vehicle is running,
    wherein the control device reduces a service level of the vehicle control for supporting at least one of a driving determination and a driving operation performed by a driver of the vehicle within the remaining time, which is shown in the prediction information generated by the communication device;
    wherein the communication device outputs an allowance request for switching the base station, and switches the base station when the communication device receives an allowance response in response to the allowance request from the control device;
    wherein the control device outputs a delay request for delaying a switching start timing of the base station when the control device receives the allowance request from the communication device while the control device is performing a driving control of the vehicle as the vehicle control, and
    wherein the communication device suspends switching of the base station when the communication device receives the delay request from the control device.

* * * * *